United States Patent [19]

Ogihara et al.

[11] 3,838,436
[45] Sept. 24, 1974

[54] OPENING DEVICE FOR AN ELECTRONIC SHUTTER

[75] Inventors: Masuo Ogihara; Masanori Watanabe, both of Chiba, Japan

[73] Assignee: Seiko Koki Kabushiki Kaisha, Tokyo, Japan

[22] Filed: May 29, 1973

[21] Appl. No.: 364,236

[30] Foreign Application Priority Data
May 26, 1972    Japan.............................. 47-52308

[52] U.S. Cl................ 354/259, 354/258, 354/260, 354/266
[51] Int. Cl. ............................................. G03b 9/08
[58] Field of Search.. 95/53 R, 53 E, 53 EA, 53 EB, 95/63, 10 CT, 10 C; 354/258, 259, 260, 266, 267, 256

[56]    References Cited
    UNITED STATES PATENTS
3,670,635    6/1972    Ort..................................... 95/53 EB
3,720,152    3/1973    Uchiyama et al................. 95/53 EB
3,722,391    3/1973    Kitai .................................. 95/53 EB

*Primary Examiner*—Joseph F. Peters, Jr.
*Attorney, Agent, or Firm*—Robert E. Burns; Emmanuel J. Lobato; Bruce L. Adams

[57]    ABSTRACT

A camera having an electronic shutter has an opening device for opening the shutter and a closing device for closing the shutter after the elapse of a predetermined time to effect an exposure. The opening device comprises a rotatable wheel having a gear connected thereto, a pivotable gear sector in mesh with the gear, a turnable opening lever in camming contact with the gear sector, and a spring system biasing the opening lever in such a manner to obtain opening of the shutter at a predetermined opening speed. The spring system consists of a first biasing spring cooperating with the wheel and acting through the gear and gear sector to bias the opening lever in a direction to oppose the shutter opening and a second biasing spring urges the opening lever in a direction to effect opening of the shutter with a force greater than that exerted by the first biasing spring to obtain opening of the shutter at the predetermined opening speed.

4 Claims, 3 Drawing Figures

OPENING DEVICE FOR AN ELECTRONIC SHUTTER

The present invention relates to an opening device for an electronic shutter of a camera and more particularly, relates to an opening device of a program EE type electronic shutter having a mechanical delay for delaying the opening speed of a set of exposure blades.

Many types of electronic shutters are known in the art but they are disadvantageous due to both their large and bulky size as well as their expensive manufacturing costs. In particular, the opening mechanisms incorporated in these prior art shutters are very complicated in construction.

It is therefore a primary object of the present invention to provide a shutter-opening device which eliminates the aforementioned defects.

It is another object of the present invention to provide an opening device for an electronic shutter which has a mechanical delay device for mechanically delaying the shutter opening to obtain a precisely controlled shutter opening speed.

It is a further object of the invention to provide an opening device for an electronic shutter which is simple in construction, reliable and efficient in operation, and rugged in nature to withstand jarring impacts and other externally applied forces.

The above and other objects of the invention are achieved by providing a camera having an electronic shutter with a shutter-opening device comprised of a turnable opening lever turnable to effect opening of the shutter, first biasing means for biasing the opening lever in a direction to effect opening of the shutter, and a delay device for mechanically delaying the turning movement of the opening lever by applying an opposing biasing force thereto which is weaker than the force exerted by the first biasing means to thereby effect opening of the shutter at a predetermined opening speed.

Having in mind the above and other objects that will be evident from an understanding of the disclosure, the present invention comprises the combinations and arrangements of parts illustrated in the preferred embodiment of the invention which is hereinafter set forth in sufficient detail to enable those persons skilled in the art to clearly understand the function, operation, construction, and advantages of it when read in conjunction with the accompanying drawings, wherein like reference characters denote like parts in the various view, and wherein.

Figure 1:
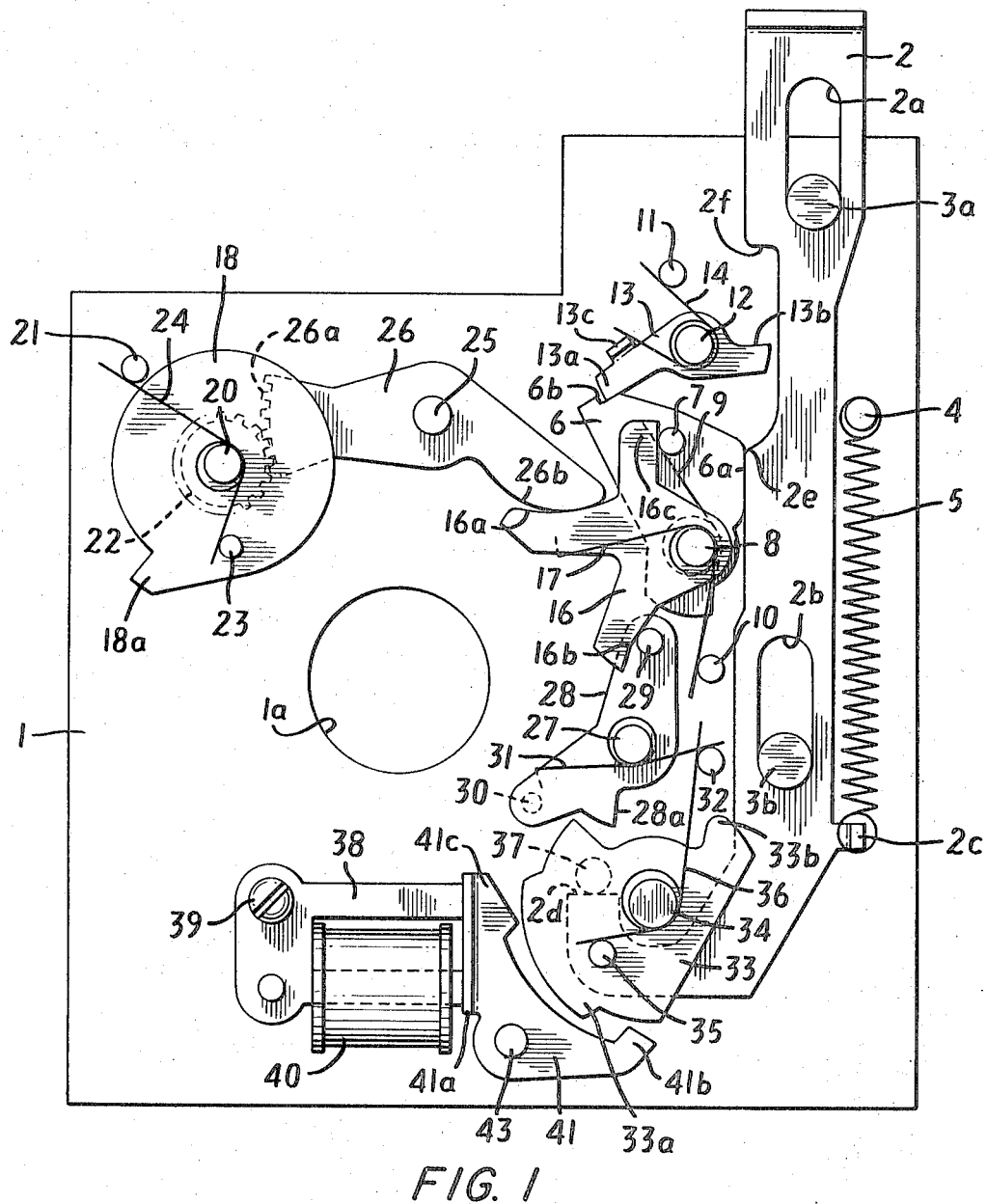
FIG. 1 is a plan view of an opening device according to the invention showing the parts in their cocked or charged state.

The opening device is shown in FIG. 1 in its cocked or charged position and the device comprises a base plate 1 supporting thereon the shutter mechanism and having an aperture 1a through its central part. A release plate 2 is movably supported on the base plate for vertical reciprocatory motion by means of guide pins 3a and 3b fixed on the base plate cooperating with guide grooves 2a and 2b in the release plate. A tension spring 5 biases the release plate 2 upwardly into the cocked position and the spring is connected at one end to a fixed pin 4 and connected at the other end to a hook portion 2c of the release plate. The release plate 2 has an arm 2d, a first cam 2e, and a second cam 2f which will be described hereinafter.

A setting lever 6 is turnably mounted upon a fixed pin 8. A pin 7 is attached to one end of the setting lever and a biasing spring 9 is disposed between the pin 7 and a fixed pin 10 to continuously bias the lever in a clockwise direction about the pin 8. The setting lever 6 has a step portion 6b and a cam portion 6a in camming contact with the first cam 2e of the release plate thereby preventing turning of the setting lever.

A locking lever or hook lever 13 is mounted for pivotal turning movement about a fixed pin 12 and has a first arm 13a in releaseable engagement with the step portion 6b. The hook lever is urged in a counterclockwise direction by a spring 14 which is disposed between a fixed pin 11 and a hook portion 13c. The hook lever 13 also has a second arm 13b capable of engaging with the second cam 2f of the release plate.

An opening lever 16 is turnably mounted upon the fixed pin 8 and is continuously urged in a clockwise direction by a biasing spring 17. The opening lever has an arm 16c in releasable engagement with the pin 7 and the spring 17 urges the opening lever 16 into constant engagement with the setting lever 6 through the coaction of the arm 16c and the pin 7. The opening lever 16 also has a first cam 16a and a second cam 16b which will be further described hereinafter.

A wheel 18 is rotatably mounted upon a pin 20 and is always given a counterclockwise turning force by means of a biasing spring 24 which is pressed between a pin 23 on the wheel and a fixed pin 21 on the base plate 1. The wheel 18 has a protruding part 18a which engages with the fixed pin 21 to limit the extent of clockwise motion of the wheel. A gear 22 is fixed firmly on the wheel and engages with a toothed portion 26a of a gear sector 26. The gear sector is pivotally mounted upon a pin 25 and has a cam portion 26b engageable with the first cam 16a on the opening lever 16. The wheel 18 has suitable mass so that the wheel inertia can be harnessed in conjunction with the meshing gear 22 and the gear sector 26 to form a mechanical delay device for controllably delaying the opening of the camera shutter as described hereinafter.

An operating lever 28 is mounted for pivotal movement about a pin 27 and is given a counterclockwise turning force by a spring 31 which is connected at one end to the lever 28 and supported at its other end by a fixed pin 32. A pin 29 is secured to one lever arm of the operating lever 28 and engages with the second cam 16b of the opening lever. Another pin 30 is secured to the underside of the other lever arm of the operating lever 28 and engages with a set of shutter exposure blades (not shown) in a well known manner to effect opening and closing of the blades in response to counterclockwise or clockwise movement of the operating lever 28. The operating lever 28 also has a protruding portion 28a which will be described later.

A closing lever 33 is mounted for pivotal turning movement about a fixed pin 34 and is given a counterclockwise turning force by a spring 36. The spring is pressed between a pin 35 on the closing lever and a fixed pin 32 on the base plate 1. A pin 37 projects outwardly from the underside of the closing lever and engages with the arm 2d of the release plate to limit the turning of the closing lever. The closing lever 33 has a protruding portion 33b engageable with the protruding portion 28a of the operating lever and a tooth portion 33a.

An electromagnet is provided to control the timing of the closing lever 33 and comprises an iron core 38 which has two legs for use as magnetic poles. One of the legs is wound with a coil 40 and the core 38 is fixed on the base plate 1 with a setscrew 39. A control lever 41 is disposed adjacent to the electromagnet and is pivotable about a pin 43. The control lever has an armature 41a magnetically coupled to the iron core 38 and a fork-like arm terminating in projections 41b and 41c engageable with the tooth portion 33a of the closing lever 33. When at a standstill, the projection 41c is associated with the upper portion of the tooth 33a of the closing lever 33 so that the armature 41a is drawn near to the iron core 38.

Figure 2:
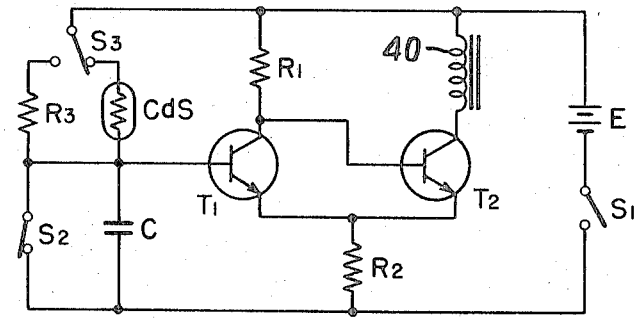
FIG. 2 is a wiring schematic of the electric circuitry used in a camera embodying this invention.

A description will now be given in conjunction with FIG. 2 regarding the electric circuitry useable with the opening device of the present invention.

A photoconductive cell CdS having a variable resistance value and a condenser C are connected in series to an electrical power supply source E with one end connected to the negative side of the supply source through a first switch S1 and the other end connected to the positive side through a mode switch S3. The condenser C is connected in parallel with a second switch S2 and the photoconductive cell CdS is connected opposite a resistor R3 having a fixed preselected resistance valve. The switch S3 selectively connects the remaining circuitry to either the fixed resistor R3 or the photoconductive cell CdS to select the photographic mode of operation of the camera.

The junction point between the photoconductive cell CdS and the condenser C is connected to the base of a transistor T1 and the collector of the transistor T1 is connected to the positive side of the power supply E through a resistor R1 and also to the base of a transistor T2. The emitters of the transistors T1 and T2 are directly coupled to each other and connected to the negative side of the power supply source E through a resistor R2 and the first switch S1. The collector of the transistor T2 is connected to the positive side of the power supply source E through the coil 40.

The first switch S1 is physically located along the path of travel of the release plate 2 and engages therewith and is closed thereby during initial downward movement of the release plate. The second switch S2 engages with the pin 7 on the setting lever 6 and the switch is arranged to open just when the setting lever is turned clockwise. The mode switch S3 can be operated by manual means and for daylight photography, it functions to connect the photoconductive cell CdS to the remaining circuitry as shown in FIG. 2, and for flashlight photography, it functions to connect the fixed resistor R3 to the remaining circuitry.

The operating cycle of the opening device will now be explained assuming that the components are in their cocked positions shown in FIG. 1. When the release plate 2 is pressed down against the force of the spring 5, the arm 2d of the release plate 2 moves down and the closing lever 33 begins to rotate counterclockwise due to the spring force exerted by the spring 36 while the pin 37 follows after the arm 2d. The first switch S1 is closed at an early stage during the course of downward movement of the release plate whereupon the transistor T2 becomes conductive causing current to flow through the coil 40. The current flow through the coil excites same and energizes the electromagnet so that the iron core 38 attracts the armature 41a provided on the control lever 41. The projection 41c of the control lever then engages with the toothed portion 33a and the armature 41a is positioned close to the iron core 38.

Figure 3:
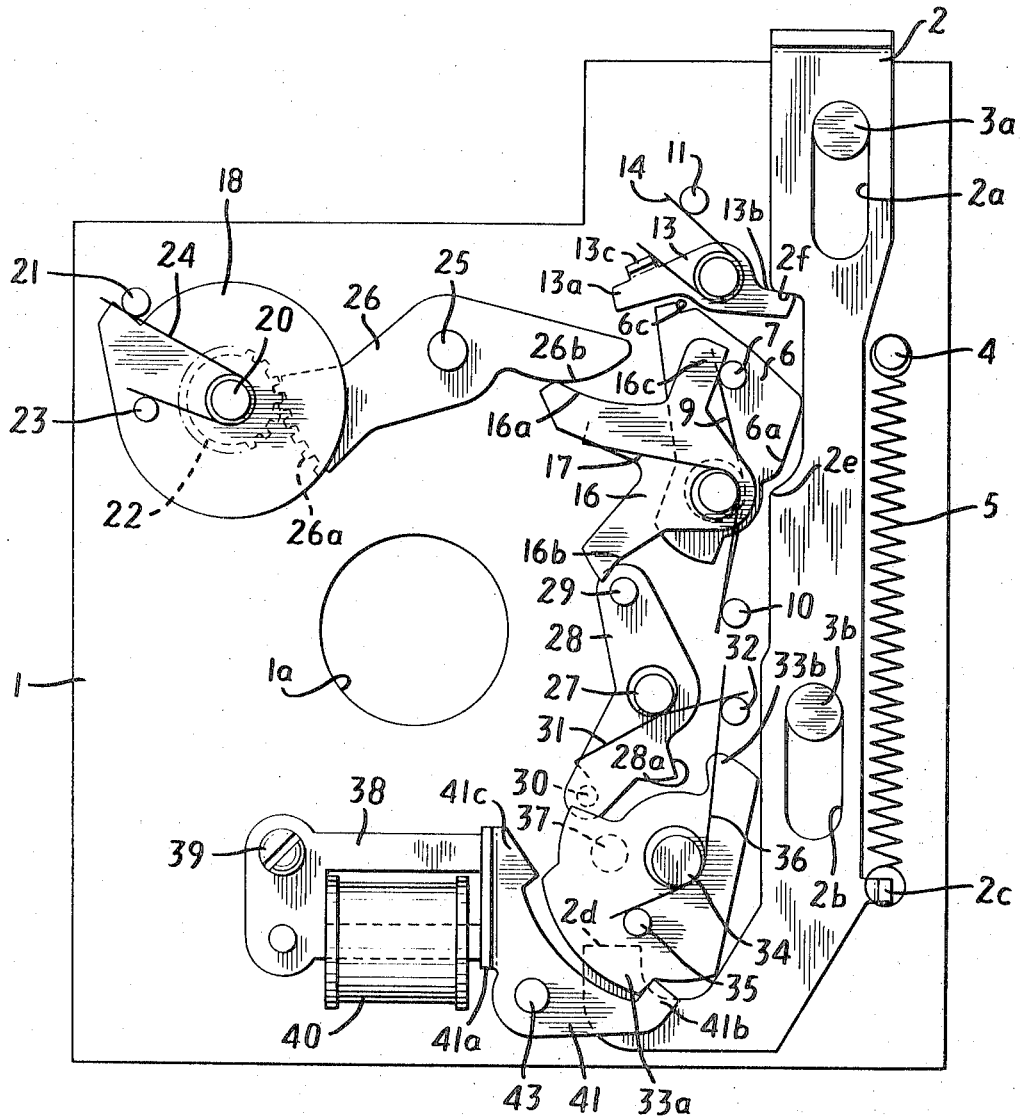
FIG. 3 is a plan view similar to FIG. 1 but showing the parts in an operating state.

As the release plate is pressed down further, the closing lever 33 accordingly turns further counterclockwise but the counterclockwise motion of the closing lever 33 is stopped when the tooth portion 33a comes in contact with the other projection 41b of the control lever as depicted in FIG. 3. This enables the arm 2d of the release plate 2 to disengage from the pin 37 in response to continued downward movement of the release plate until a position is reached where the pin 37 is not interrupted so that the closing lever 33 can be rotated further in the counterclockwise direction in order to close the shutter exposure blades.

During this time, the first cam portion 2e of the release plate also moves to a position wherein clockwise rotation of the setting lever 6 will not be hindered when the shutter exposure blades open. During this time, the hook lever 13 remains stationary since the first arm 13a is still connected with the step portion 6b of the setting lever 6. When the release plate is pressed down further, the second cam portion 2f of the release plate 2 comes into contact with the second arm 13b of the hook lever and cams the hook lever clockwise against the spring force of the spring 14 thereby disengaging the first arm 13a from interlocking relation with the step portion 6b of the setting lever. The setting lever 6 then begins to rotate clockwise due to the spring force of the spring 9. Simultaneously and synchronously with the rotation of the pin 7 which is connected to the setting lever 6, the opening lever 16 also starts turning clockwise due to its own spring force exerted by the spring 17. Since the first cam 16a of the opening lever is in camming contact with the cam portion 26b of the gear sector 26, the motion of the opening lever 16 is controlled by the inertia of the wheel 18 and by the force of the biasing spring 24 acting through the gear wheel 22 and the gear sector which jointly comprise the delay device for delaying the motion of the opening lever 16 in a controlled manner. Therefore the opening lever turns in the clockwise direction at a speed slower than that of the setting lever 6. The spring force exerted by the biasing spring 24 is weaker than that exerted by the biasing spring 17 so that the opening lever 16 will be sufficiently biased by the spring 17 to turn about the pin 8 and effect opening of the shutter blades. The spring force exerted by the spring 24 acts through the meshing gear 22 and gear sector 26 and is continuously transmitted to the cam portion 26b which thereby exerts an opposing biasing force on the opening lever 16 in a direction opposite to that exerted by the spring 17 throughout the opening of the shutter.

In accordance with the invention, the spring force exerted on the opening lever 16 and that exerted on the wheel 18 are acting on each other in a cancelling or opposing direction and the first cam 16a of the opening lever and the cam portion 26b of the gear sector are designed to increase the speed ratio to their displaced positions thereby controlling the wheel inertia beyond its usual capacity.

In response to clockwise motion of the opening lever 16, the operating lever 28 which has pin 29 in camming contact with the second cam 16b of the opening lever begins to turn counterclockwise by its own spring force following after the motion of the opening lever 16. The movement of the operating lever 28 in the counterclockwise direction effects opening of the set of shutter exposure blades through the pin 30 in a manner well known in the art. As aforementioned, however, the movement of the opening lever in the clockwise direction is delayed by the delay device and consequently the opening of the camera shutter is controlled so that the opening area can be increased in a predetermined relation to the elapsing of time.

The operation of the electric circuit will now be described starting when the setting lever 6 has turned counterclockwise sufficiently to cause the pin 7 to open the second switch S2. Light impinging on the photoconductive cell varies the resistance thereof and the condenser C is charged at a rate determined by the resistance of the photoconductive cell. As the potential of the base of the transistor T1 is then still low, this transistor remains in a nonconductive state, and therefore the transistor T2 remains conductive. Accordingly, the control lever 41 under the control of the energized coil 40 and the iron core 38 stays in the position as shown in FIG. 3.

After an elapse of time corresponding to the intensity of light in this condition, the charging voltage of the condenser C rises to a given voltage level at which the transistor T1 becomes conductive and therefore the transistor T2 becomes nonconductive. When the transistor T2 becomes nonconductive, the iron core 38 is demagnetized thus allowing the control lever 41 to be set in motion. This also enables the closing lever 33, under the control of the control lever 41, to start turning counterclockwise by its own spring force. As the closing lever 33 is rotated more, the protruding portion 33b comes into contact with the protruding part 28a of the operating lever after which the closing lever 33 causes the operating lever 28 to rotate clockwise against the spring force of the operating lever spring thereby completing the closing of the shutter exposure blades. The diaphragm aperture size and the exposure time duration can also be determined at the same time according to the brightness of the light in a manner known in the art.

After completion of the photographic operation, the release plate 2 is released and starts returning upward by the spring force of the spring 5. At an early stage of the release plate return movement, the first cam 2e of the release plate engages the cam 6a and causes the setting lever 6 to rotate counterclockwise against the force of its spring 9 and allows the opening lever 16 to return through the action of the pin 7 and the arm 16c. The second cam 2f of the release plate disengaged from the hook lever 13 thereby enabling the hook lever to return by its own spring force so that the arm 13a falls into the step portion 6b and comes to an end when the setting lever has been completely returned. Then the wheel 18 and the gear sector 26 return to a standstill state by the spring force exerted by the spring 24. When the setting lever 6 has nearly completed returning to its original uncocked position, the arm 2d of the release plate comes into contact with the pin 37 on the closing lever 33, and by susequent returning action, the release plate causes the closing lever to turn clockwise against the force offered the the spring 36 whereupon the components are returned to the state shown in FIG. 1.

The camera constructed in accordance with the present invention can be made at a very low cost because the opening lever and the setting lever as well as the other levers have a comparatively simple configuration that can be shaped by easy machining methods using a press, etc. and also can lessen the force required during the cocking or setting operation because the spring force in the delay device is made to act in the reverse direction to the direction of the spring force of the opening lever. Moreover, the ever-set type of device as shown in this embodiment is advantageous since only a small releasing force is needed and the device offers improved durability of the set-release mechanisms.

The invention has been described in conjunction with one preferred embodiment and many other modifications will become apparent to those skilled in the art and the present invention includes all such modifications falling within the scope and spirit of the invention as described in the appended claims.

What we claim is:

1. In a camera having an electric shutter movable from a closed state to an open state and back to said closed state to effect an exposure: opening means for opening said shutter at a predetermined opening speed to initiate an exposure comprising a turnable lever having one position corresponding to that wherein said shutter is closed and turnable in one direction from said one position to effect opening of said shutter, means for releasably locking said turnable lever in said one position, first biasing means biasing said turnable lever in said one direction with a first biasing force sufficient to effect turning of said turnable lever in said one direction when said turning lever is unlocked to thereby effect opening of said shutter, and delay means including second biasing means continuously biasing said turnable lever in a direction opposite to said one direction throughout the opening of said shutter with a second biasing force weaker than said first biasing force to oppose the opening of said shutter for mechanically delaying the turning of said turnable lever in said one direction with a preselected time delay to effect opening of said shutter at a predetermined opening speed; and closing means for closing said shutter to complete said exposure.

2. A camera according to claim 1; wherein said delay means comprises a rotatable toothed gear, a pivotable gear sector having a toothed portion in mesh with said toothed gear and a cam portion, a pivotable opening lever having one arm in camming contact with said cam portion and another arm in camming contact with said turnable lever, and wherein said second biasing means comprises means for biasing said toothed gear in one rotational direction to apply said second biasing force through said gear sector and said opening lever to said turnable lever whereby said first biasing force effects pivotal movement of said opening lever and said gear sector and rotation of said gear against the opposing action of said second biasing force.

3. A camera according to claim 2; wherein said delay means includes a rotatable wheel connected for rotation with said toothed gear and having a preselected mass effective to offer inertial resistance to rotation of said wheel to obtain opening of said shutter at said predetermined opening speed.

4. A camera according to claim 3; wherein said second biasing means comprises a biasing spring coacting with said wheel for biasing said toothed gear in said one rotational direction.

* * * * *